United States Patent [19]

Criblez

[11] 3,886,829
[45] June 3, 1975

[54] DEVICE FOR SHEARING ROD SECTIONS IN AN AUTOMATIC MULTI-STAGE CROSS-FED PRESS

[75] Inventor: Roger Criblez, Bottmingen, Switzerland

[73] Assignee: Hatebur Umformmaschinen AG, Basel, Switzerland

[22] Filed: Apr. 29, 1974

[21] Appl. No.: 465,405

[30] Foreign Application Priority Data
May 5, 1973 Germany............................ 2322770

[52] U.S. Cl. .................... 83/198; 83/554; 83/580; 83/616; 83/617; 83/628; 83/639
[51] Int. Cl. .............................................. B26d 3/16
[58] Field of Search ............. 83/198, 554, 580, 616, 83/617, 628, 639

[56] References Cited
UNITED STATES PATENTS

| | | | |
|---|---|---|---|
| 2,136,831 | 11/1938 | Vuilleumier | 83/198 X |
| 3,735,656 | 5/1973 | Strandell et al. | 83/198 |
| 3,800,645 | 4/1974 | Alcock et al. | 83/198 |

Primary Examiner—Frank T. Yost
Attorney, Agent, or Firm—Markva & Smith

[57] ABSTRACT

This invention relates to a device for shearing rod sections in an automatic multi-stage cross-fed press which includes an impact carriage and a cutter carriage. The two carriages being connected together by a coupling and including a brake for braking relative movement between the couplings.

9 Claims, 8 Drawing Figures

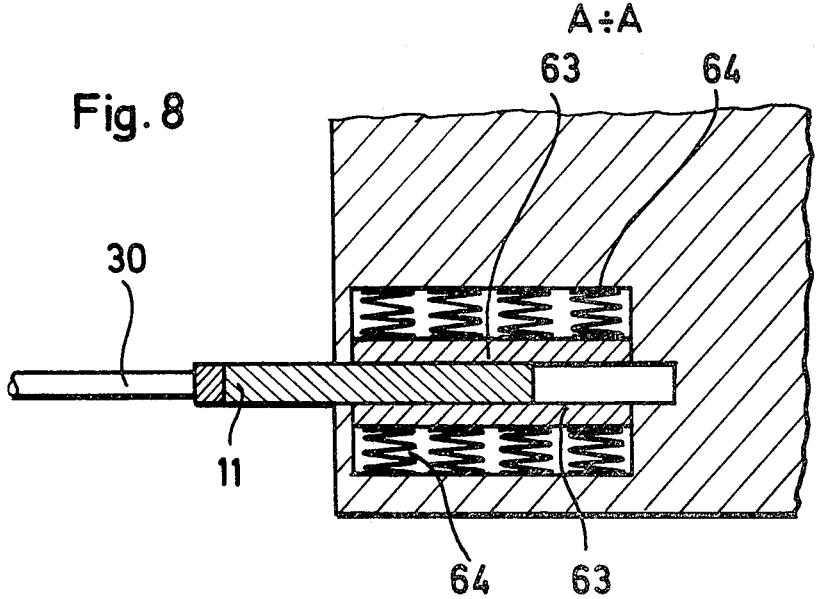

DEVICE FOR SHEARING ROD SECTIONS IN AN AUTOMATIC MULTI-STAGE CROSS-FED PRESS

The present invention relates to a device for shearing rod sections in an automatic multi-stage cross-fed press and more especially to such a device for use in a press having a sliding cutter carriage carrying the shearing blade and a sliding hammer or impact carriage arranged coaxially with the cutter carriage and rigidly connected to a reciprocating drive mechanism, the stroke of the hammer or impact carriage being so dimensioned that it impinges on the cutter carriage during the final portion of its work stroke and imparts to the sliding cutter carriage the power required for shearing the rod section.

It is known that automatic multi-stage cross-fed presses serve for quantity production of forgings. The rod forming the starting material is first sub-divided into sections of suitable length, whereupon the blank is brought by automatically controlled cross-fed tongs from one press station to the adjacent station for the purpose of successive deformation. The rod is intermittently taken in and this operation is synchronised with the deformations.

In view of the deformation in the closed die the volume of the sheared rod section should lie within a specific, pre-calculated range of tolerance. This can only be ensured when, regardless of the extraordinarily fast working speed of the machine, the plane of shear of all sections is substantially equal and irregularities are virtually precluded.

It is thus expected of shearing devices of this kind that, with a view to obtaining a perfect plane of shear, the shearing blade impinges on the rod at maximum possible speed, and that moreover all work phases of the shearing mechanism be well controllable, despite the fast working rate.

A shearing mechanism is known in which the cutter carriage is rigidly connected to a crank and has a bore serving to receive the leading end of the rod. The circular rim of the bore represents the shearing blade. The arcuate design of this shearing blade has actually given satisfactory results but it is a disadvantage of this construction that after insertion of the rod end the initial speed starts at zero. But this is unfavourable since the shearing process proper only occurs in the very first part of the cut, i.e. in a first fraction of the shear cross-section and thus the configuration of the plane of shear is determined by the first phase of shearing.

In order to improve the quality of the plane of shear by increasing the shear velocity at the start of the shearing process it has been proposed to arrange in front of a freely movable sliding cutter carriage a sliding hammer carriage rigidly connected to the drive crank, the dynamic energy of which hammer carrier is transmitted to the cutter carriage during the work stroke. In theory this arrangement should have produced more constant planes of shear but practical experimentation soon showed that at the high operating frequencies the uncontrolled cutter carriage can no longer be governed and as a result of recoil and uncontrolled impact stresses a relatively large percentage of rejects is unavoidable. It is also repeatedly the case that, because of the recoil effects, intake of the rod lying in readiness cannot occur at the correct time and undesirable stoppages thus result. It further proved difficult or impossible to ensure that the cross-feed tongs safely take over the sheared off sections.

Consideration must furthermore be given to the fact that an enormous energy is imparted to the cutter carriage when it is struck by the hammer carriage which energy is briefly dammed up during shearing of the rod section but subsequently imparts to the cutter carriage a strong acceleration. Just prior to the shearing process the cutter carriage will therefore speed ahead of the hammer carriage so that recoil effects and inconvenient impact stresses are unavoidable.

According to the present invention there is provided a device for shearing rod sections in an automatic multi-stage cross-fed press, such a device comprising a cutter carriage for shearing rod sections from a rod feed stock, an impact carriage arranged co-axially with the cutter carriage, a reciprocable drive arrangement rigidly coupled to the impact carriage, the drive arrangement having a drive stroke which enables the impact carriage to impinge on the cutter carriage during the final portion of a drive stroke to thereby transmit to the cutter carriage the energy necessary to perform a shearing operation, a coupling element interconnecting the impact carriage and the cutter carriage, the coupling element being rigidly connected to one of the carriages and being connected to the other carriage so that it is movable over a relatively small portion of the movement of that carriage and a braking device for engaging the cutter carriage or the coupling element to arrest the relative movement between the cutter carriage and the impact carriage in both directions of the reciprocable movement.

As a result of this arrangement the movements of the cutter carriage occur at a controlled rhythm. The heavy blows occurring in the known devices are definitely precluded by the hydraulic cushioning. Since, moreover, the early stage of the shearing process occurs at relatively high speed, extremely clean and even planes of shear result.

The aforesaid cushioning or damping element is suitably a disc piston provided with at least one overflow passage the actuating rod of which piston is slidably mounted to either side of the above mentioned bore.

It is also feasible for the cutter carriage to have a rectangular cross-section and for spring-loaded brake shoes to engage at at least two oppositely located flat surfaces.

Illustrative embodiments of the present invention will now be described with reference to the accompanying drawings, in which:

FIGS. 6, 7 and 8 show two variants of the press.

Figure 1:
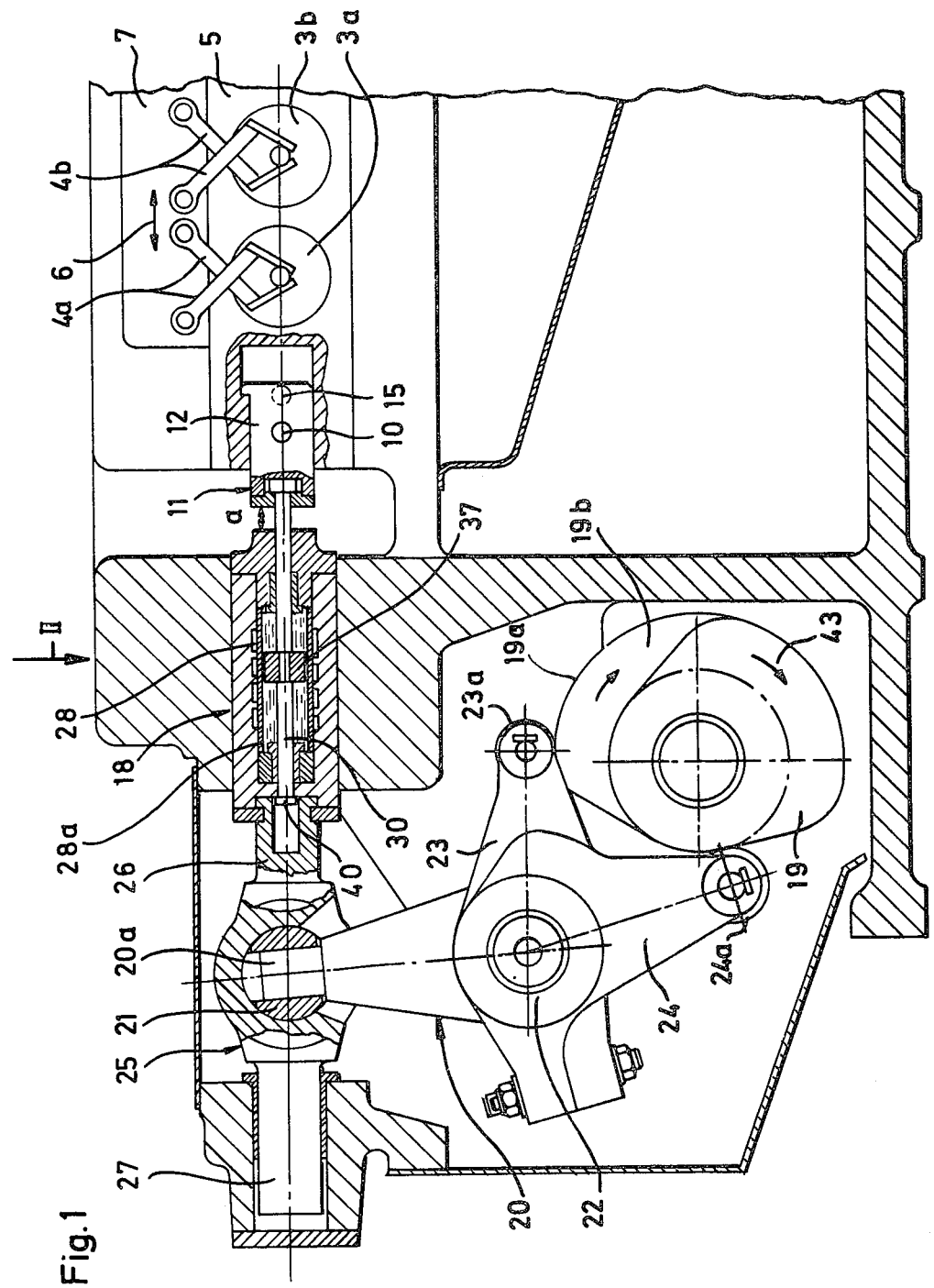
FIG. 1 is a simplified sectional view of the shearing station of an automatic multi-stage cross-fed press.
Figure 2:
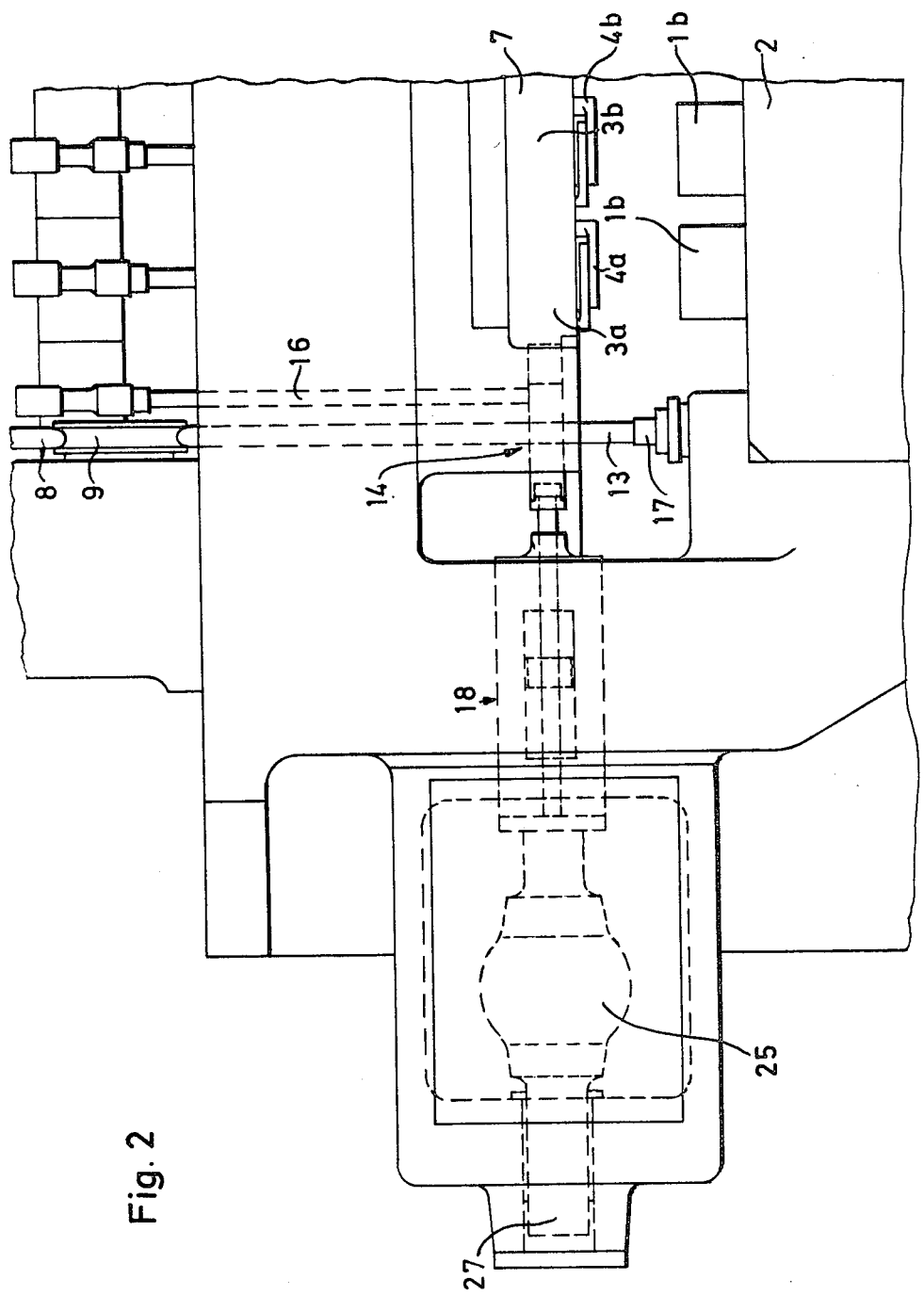
FIG. 2 is a plan view in the direction of arrow II of the shearing station illustrated in FIG. 1.

As is shown in FIGS. 1 and 2 of the drawings, the illustrated cross-fed press has a number of press stamps $1a$, $1b$ etc., which are mounted on a reciprocatingly displaceable press carriage 2. Opposite the press stamps there are arranged dies $3a$, $3b$ etc., in which the shaping of blanks takes place. The dies are disposed on an anvil 5 mounted to a frame of the press and carrying a sliding carriage 7 which is adapted for reciprocating displacement in the direction of arrow 6. Pairs of tongs $4a$, $4b$, etc., which serve to cross-feed the blanks are located on the sliding carriage 7.

The raw material to be processed, in the form of a rod or wire, 8, is intermittently drawn into the press via a pair of intake rolls 9 and against a stop 17. While being taken in each respective leading section of the rod 8 is inserted into the throughbore 10 of a sliding cutter carriage 11 whereupon the cutter carriage is shifted in the direction of the arrow 12 and the rod section designated by the numeral 13 in FIG. 2 is sheared off at 14. The rod section, which after the advance of the cutter carriage is situated at 15, is now ejected from the bore of the cutter carriage by an ejection bar 16, gripped by the pair of tongs 4a and conveyed to face the first die 3a.

The energy required for shearing is transmitted to the cutter carriage 11 by a hammer or impact carriage generally designated by the reference numeral 18 and driven to reciprocate by a cam disc 19 via a rocking lever 20. The rocking lever 20 on the one hand projects with a pin 20a into the bore of a ball joint 21. On the other hand the rocking lever 20 which is pivotable about a shaft 22 has two control arms 23 and 24 provided with rolls 23a and 24a at their end portions. The control surfaces 19a and 19b of the cam disc 19 are arranged in two different vertical planes and of such configuration that both rolls 23a and 24a continuously contact the control surfaces and the rocking lever 20 is thus positively entrained.

The ball joint coupling generally designated by the reference numeral 25 is rigidly connected, via a connecting member 26, with the hammer carriage 18, while on the other hand the sliding pin 27 disposed on the opposite side is slidingly mounted in a bore of the press frame.

Figure 3:
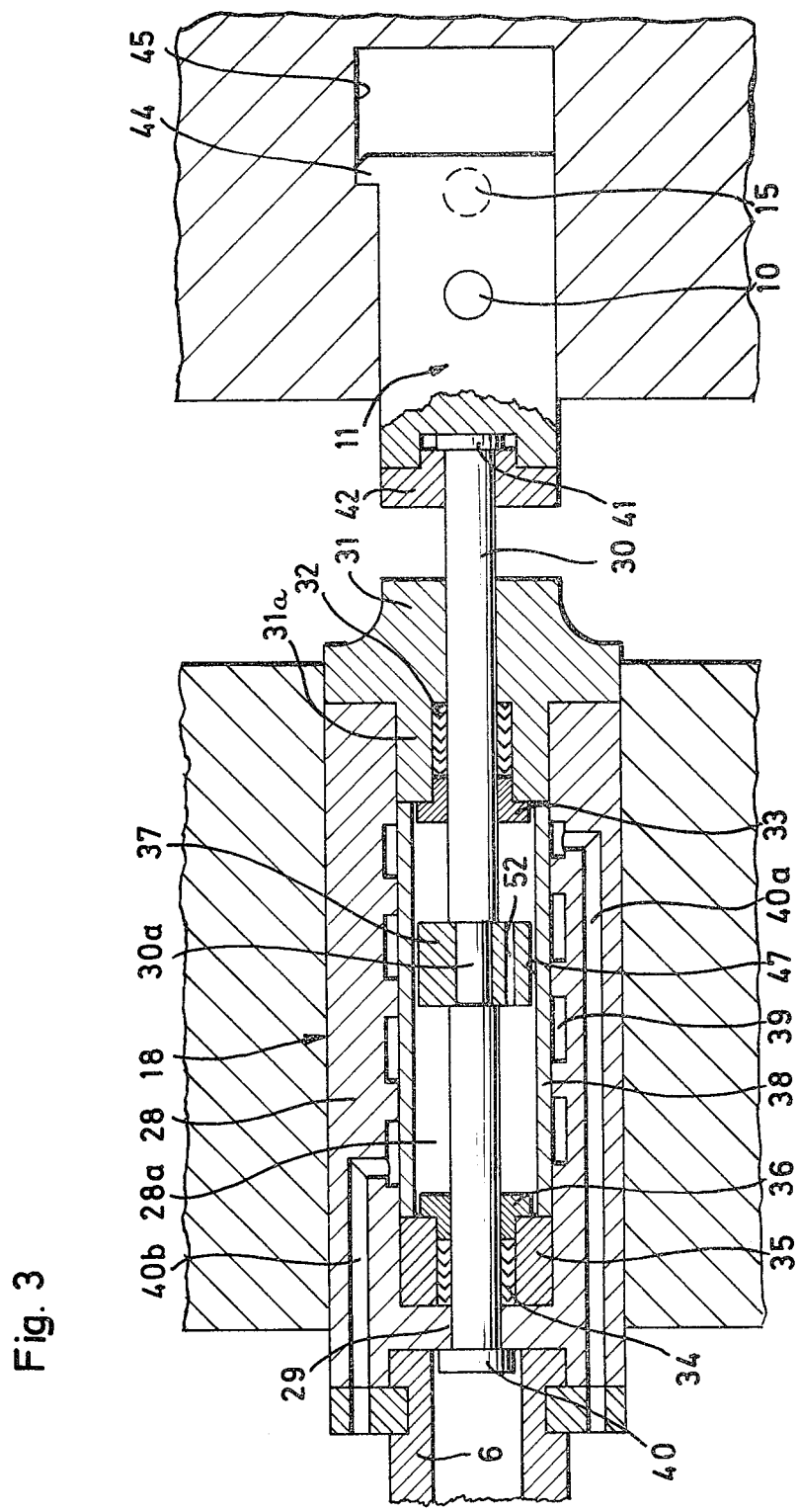
FIGS. 3 to 5 show the shearing mechanism in three different stages.
Figure 4:
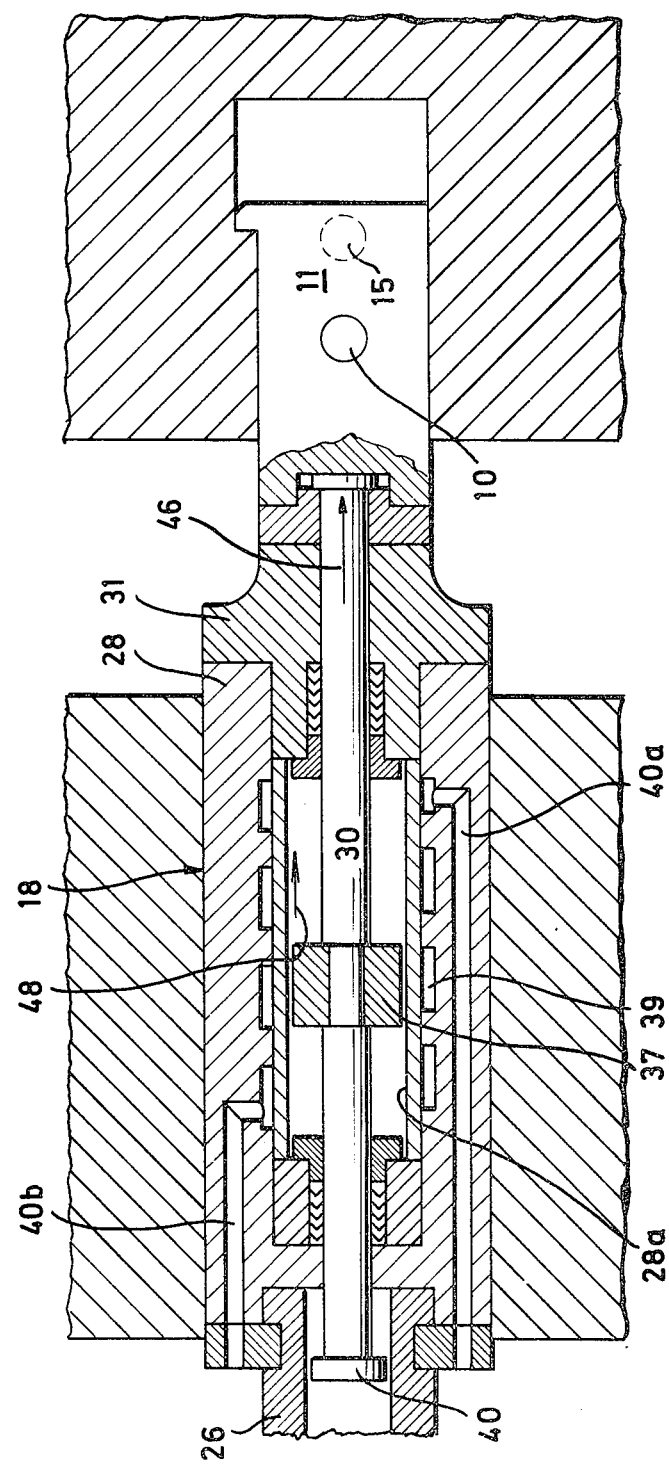
Figure 5:
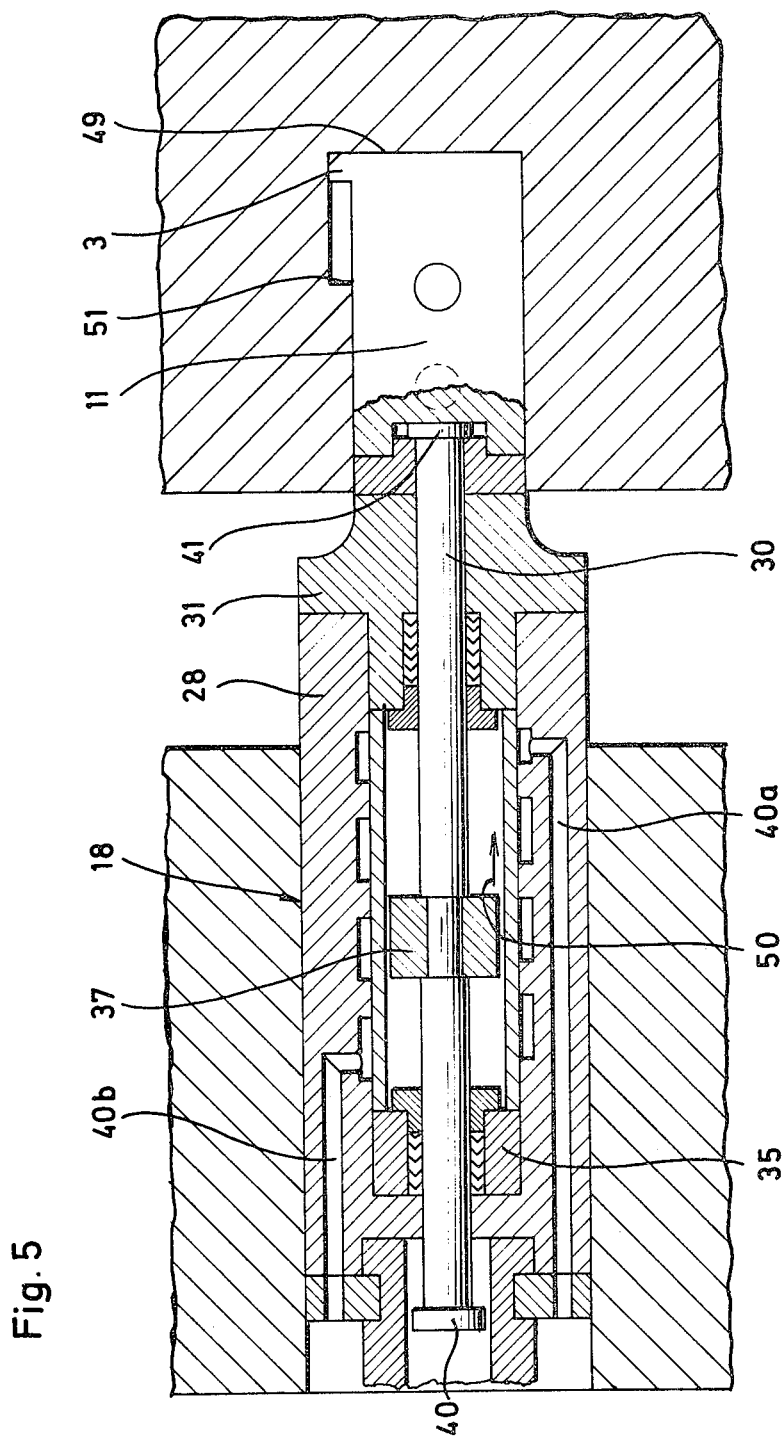

The construction of the blow and shear unit comprising the impact carriage 18 and the cutter carriage 11 is apparent from FIG. 1 in conjunction with the enlarged illustrations of FIGS. 3 to 5. The impact carriage 18 has a cylindrical housing 28 which is open at the side facing the cutter carriage 11 and has a throughbore 29 (FIG. 3) at the opposite side. The coupling rod 30 which traverses the cylindrical housing 28 from end to end passes on the one hand through the wall of the bore 29 and on the other hand into the bore of the hammer head or ram 31. The hammer head projects with an annular shoulder 31a into the bore of the housing 28 and in this region defines a seal 32 retained by a sealing cap 33. At the opposite end of the housing bore there is arranged a seal 34 surrounded by a supporting ring 35 and retained by a sealing cap 36. The coupling rod has in its median region a section 30a of reduced diameter to which a two-part disc piston 37 is rigidly secured. Between the free face of the supporting ring 35 and the annular shoulder 31a of the ram 31 a sleeve 38 is inserted. This sleeve forms the internal boundary of a water cooling passage 39 which surrounds the sleeve 38 in the form of a helix. The cooling water is supplied to the passage 39 via a line 40a, flows through the helical cooling water passage 39 and leaves the latter via an outlet 40b.

The coupling rod 30 has at its end portion projecting into the bore of the connection member 26 a driver head 40 and at its opposite end a clamping head 41. The clamping head 41 is retained in a recess of the cutter carriage 11 by a screwed on clamping member 42 so that the coupling rod 30 is rigidly connected to the cutter carriage 11. The cutter carriage 11 has substantially the form of a massive, rectangular steel prism having in its central region the throughbore 10 serving to receive the rod to be sheared. The cutter carriage is displaceably mounted in a guideway in the anvil and has at its inwardly situated end section a stop 44 guided in a groove 45. The length of the groove 45 is so dimensioned that in the intake position the bore 10 is in the rear dead centre of the cutter carriage and in the ejection position 15, indicated by a broken line, the bore 10 is in the forward dead centre of the cutter carriage.

The manner in which the press works is illustrated in FIGS. 3 to 5.

In the initial position shown in FIG. 3, which also corresponds to FIGS. 1 and 2, the cutter carriage 11 is in the intake position. The rod 13 (FIG. 2) thus passes through the bore 10 of the cutter carriage and its free face contacts the stop 17. The impact carriage 18 is situated in its rear dead centre with the driver head 40 contacting the outer surface of the housing 28. the piston 37 is situated approximately midway of the housing bore 28a which is filled with a liquid medium, e.g. hydraulic fluid.

When the cam disc 19 (FIG. 1) which is coupled via a bevel gear to the drive crank shaft of the press carriage 2, continues to rotate in the direction of arrow 43, then the hammer carriage 18 moves toward the cutter carriage until it eventually impinges on the front face of the cutter carriage and thus reaches the position shown in FIG. 4. During this movement the coupling rod 30 has exerted a certain force, in the direction of the arrow 46 (FIG. 4), on the cutter carriage 11. But this force is not sufficient to shear the rod section 13 or to initiate shearing, since a comparatively wide annular gap 47 has been left between the circumference of the piston 37 and the inner wall of the housing bore 28a which gap permits liquid medium to flow from one side of the piston to the other. Thus, during the movement of the hammer carriage from the FIG. 3 to the FIG. 4 position the piston 37 remains in its absolute position while the hydraulic fluid passed through the annular gap 47 in the direction of the arrow 48 (FIG. 4). The width of the annular gap 47 is preferably so dimensioned that shearing off the section of rod is impossible during this first, so far described, phase of movement, but that on the other hand some flow resistance must be overcome.

In the position illustrated in FIG. 4 the hammer carriage 18 has attained approximately its maximum velocity and now meets the free end face of the cutter carriage 11. The cutter carriage 11 is therefore entrained at a large initial acceleration, thereby shears the rod section off the rod, and speeds slightly ahead of the hammer carriage. But since the cutter carriage is connected by the coupling rod 30 with the hydraulically braked piston this speeding ahead movement is correspondingly retarded and a hard impact or recoil is avoided. FIG. 5 shows the cutter carriage in its forward dead centre in which the ejector 16 has pushed the rod section out of the cutter carriage bore 10 into the expectant arms of the cross-feed tongs. The return movement of the cutter carriage which begins after the ejection process is also damped by the piston 37 displaceable within the liquid medium, the impact carriage lifting off the cutter carriage and displacing the liquid medium in the direction of the arrow 50. Thus on the part of the impact carriage there is no positive, but a retarded, entrainment of the cutter carriage 11, so that the abutments 44 also impinge at reduced speed on the faces 51 of the groove 45. The inconvenient recoil effects are prevented in this manner and the strain on the material is far less than is the case in the known cutter carriages without damping of movement.

Depending on the design of the hydraulic braking device the two faces of the impact carriage 18 and the cutter carriage 11 which contact one another according to FIG. 5 may alternatively remain in contact during part of the return movement of the impact carriage. But they separate at the latest when the driver head 40 of the coupling rod 30 impinges on the outer wall of the housing bottom. This is the case, since the length of the coupling rod 30 is so dimensioned that the cutter carriage is in the rear dead centre drawn toward the abutment surface 51 with only very little play and thus the bore of the cutter carriage comes to rest precisely in front of the rod to be taken in.

Thus the device which has been described ensures that the shearing blade has a relatively high speed already at the beginning of the shearing process, so that a right-angled and clean plane of shear results. By virtue of the hydraulic coupling of impact carriage and cutter carriage excessive straining of the material is prevented while the cutter carriage is nevertheless certain to be precisely positioned in its two end positions.

The embodiment described may be modified in numerous ways. It would thus be readily possible to envisage instead of the annular gap 47 (FIG. 3) one or more throughflow passages 52 (FIG. 3) traversing the piston. By suitably selecting the number and cross-sections of these passages as well as the viscosity of the liquid medium any desirable variant of the manner of working of the described device may be attained.

Figure 6:
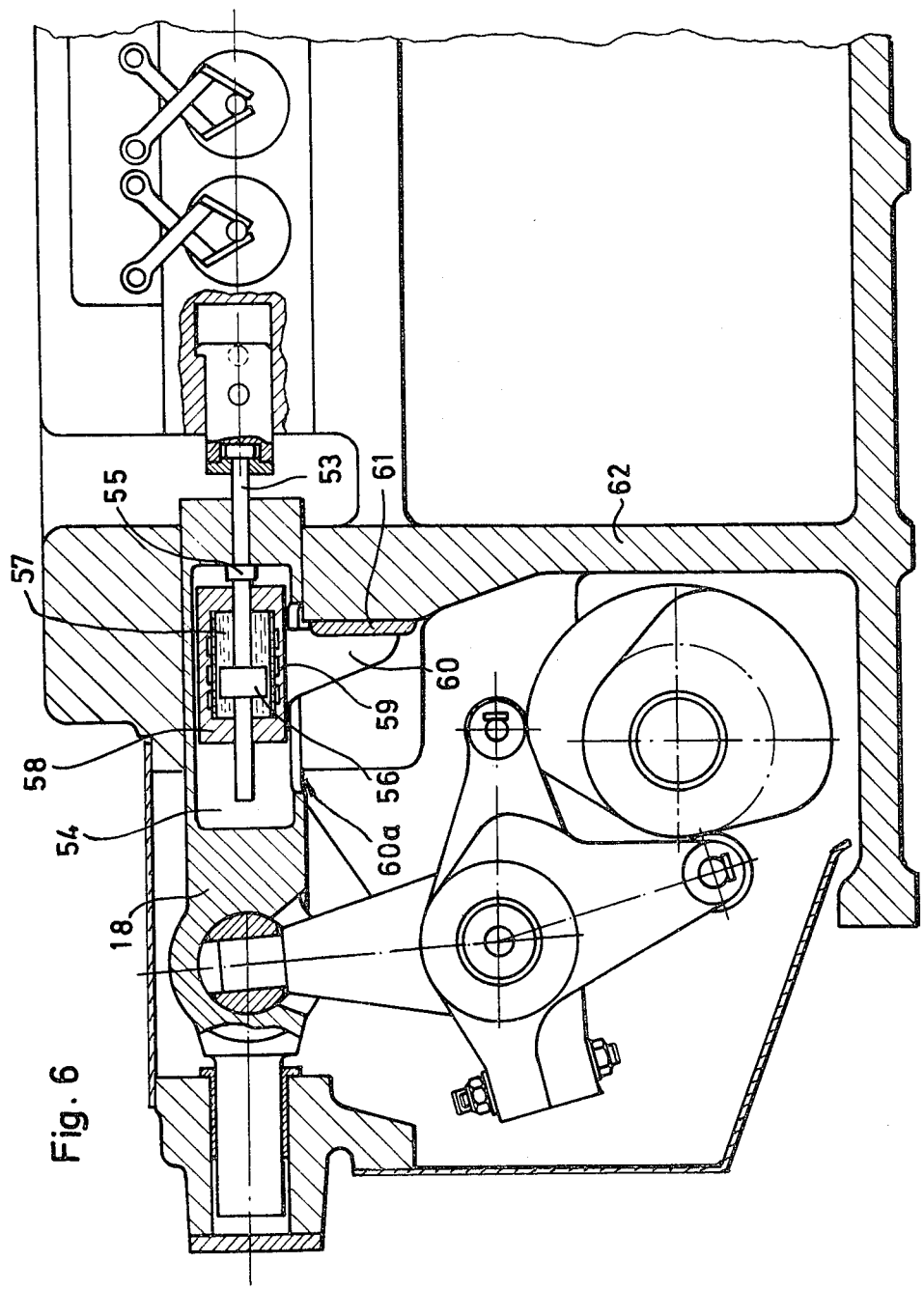

A further embodiment of the press is shown in FIG. 6 in which the already used reference numerals are again used for those parts which have remained unchanged in functional and constructional respects.

According to FIG. 6 the cutter carriage 11 is again connected with the impact carriage 18 by means of a coupling rod 53 one end of which is (as shown in FIG. 1) rigidly connected to the cutter carriage 11. The coupling rod 53 protrudes into the impact carriage 18 provided with a recess 54 and is provided with an abutment flange 55 and a disc piston 56 rigidly connected to the coupling rod 53. A cylinder 58 filled with a liquid 57 is disposed within the virtually cylindrical cavity 54 of the impact carriage 18, the two end faces of which cylinder 58 contain bores for bearing the coupling rod 53. The cylinder 58 is equipped with a helical cooling medium passage 59 and is supported by a plinth 60 which in turn is firmly secured to the frame 62 of the press by means of a flange 61. As is shown in FIG. 6 the plinth 60 projects through a slot 60a into the recess 54 of the impact carriage.

The cylinder 58 containing the hydraulic medium 57 is in this embodiment therefore (in contrast to the FIG. 1 embodiment) stationarily disposed at the frame of the press. But in both cases a retardation of the cutter carriage movement is effected both during the advance and during the return movement.

Figure 7:
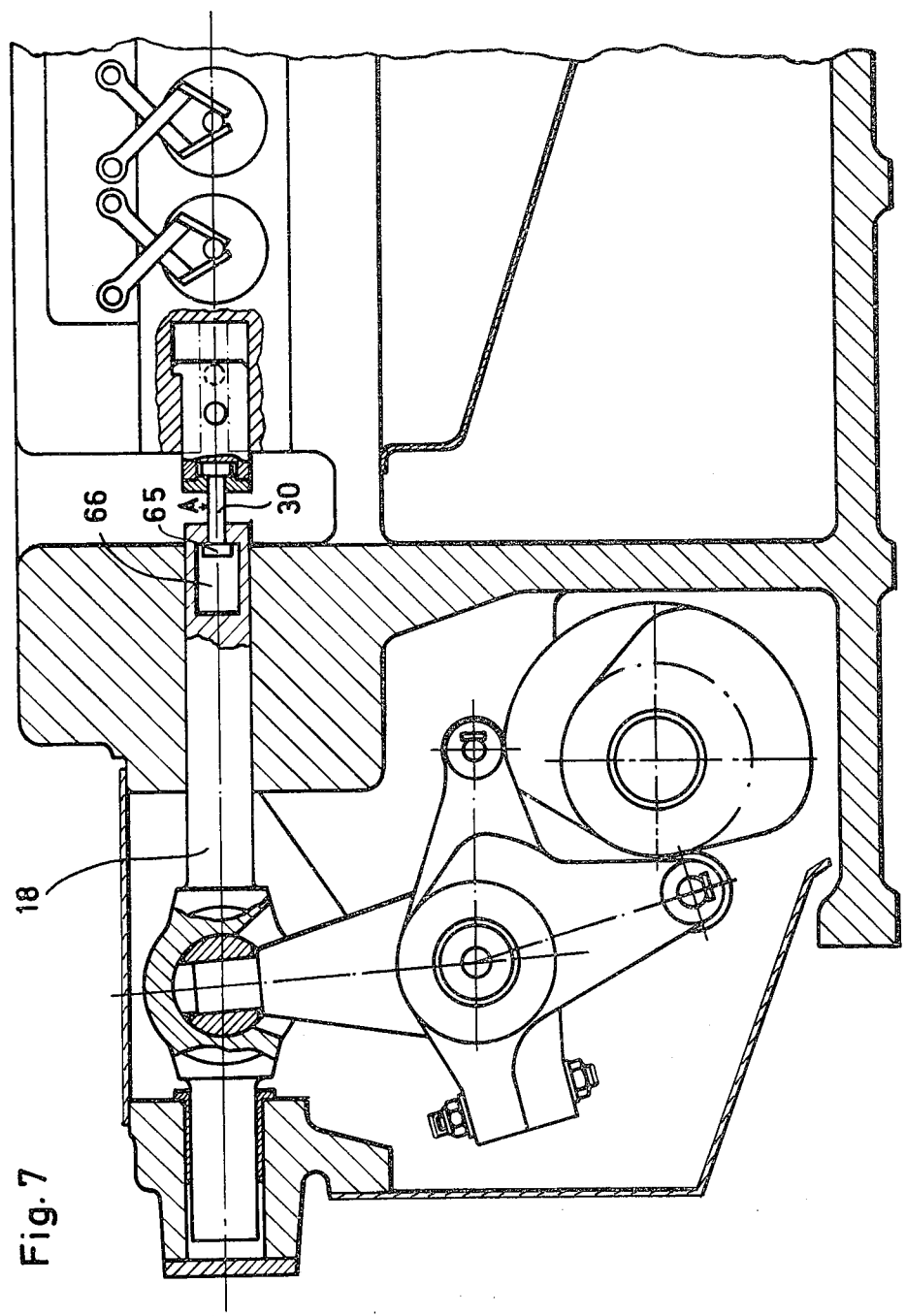

This retardation can alternatively be effected by mechanical means, as is shown in FIGS. 7 and 8. In this case the cutter carriage 11 is braked by brake shoes 63 which are urged against the cutter carriage by helical springs 64 and engage at the parallel, vertical flat surfaces of the cutter carriage. By appropriate choice of the springs and of the surface finish of the cutter carriage it is possible to obtain the desired braking effect with very great precision. In this case too the coupling rod 30 is rigidly secured to the cutter carriage 11 and on the other hand projects with a head 65 into a recess 66 of the hammer carriage 18.

I claim:

1. A device for shearing rod sections in an automatic multi-stage cross-fed press, such a device comprising a cutter carriage for shearing rod sections from a rod feed stock, an impact carriage, said impact carriage being arranged co-axially with said cutter carriage, a reciprocable drive arrangement, said drive being rigidly coupled to the impact carriage, said drive having a drive stroke which enables the impact carriage to impinge on the cutter carriage during the final portion of a drive stroke to thereby transmit to said cutter carriage the energy necessary to perform a shearing operation, a coupling element, said coupling element interconnecting said impact carriage and said cutter carriage, said coupling element being rigidly connected to one of said carriages and being connected to the other carriage so that it is movable over a relatively small portion of the movement of that carriage and a braking device, said braking device being adapted to engage one of said cutter carriages or coupling element to arrest the relative movement between said cutter carriage and said impact carriage in both directions of the reciprocable movement.

2. A device according to claim 1, which includes a hydraulic coupling, said coupling connecting said impact carriage to said cutter carriage, said hydraulic coupling including a braking element arranged in means defining a recess and which is displaceable in a fluid medium and is rigidly connected to said cutter carriage, said braking element having an overflow arrangement to allow the fluid medium to flow from one side of the braking element to the other side thereof.

3. A device according to claim 2, in which said recess means is a fluid-tight sealed bore means arranged in said impact carriage.

4. A device according to claim 2, in which the braking element includes a disc-shaped piston and a piston rod slidably mounted along the length of the bore means.

5. A device according to claim 4, in which one end of said piston rod is rigidly secured to said cutter carriage and the other end is secured to a driven member which is displaceable in the bore means to control the alignment of said cutter carriage with the rod feed stock from which the rod sections are sheared.

6. A device according to claim 4, in which the overflow arrangement includes means defining an annular gap formed between the piston and the wall of the bore.

7. A device according to claim 4, in which the piston includes means defining at least one throughbore therein.

8. A device according to claim 2, in which a hydraulic cylinder is provided in the recess, the braking element being in the form of a piston slidably mounted in the cylinder, the cylinder being held in position in the recess by a stationary mounted support member, and the length of the recess measured in the direction of the shear-off movement exceeding the overall length of the cylinder by at least the stroke of the impact carriage.

9. A device according to claim 1, in which the cutter carriage has a rectangular cross-section and the braking device includes spring-loaded brake shoes, said shoes being arranged to engage the mutually opposite flat surfaces on the cutter carriage.

* * * * *